(12) United States Patent
Hwang et al.

(10) Patent No.: US 8,930,688 B2
(45) Date of Patent: Jan. 6, 2015

(54) APPARATUS AND METHOD FOR PROVIDING SECURITY SERVICE OF USER INTERFACE

(75) Inventors: Seo-Young Hwang, Suwon-si (KR); Jae-Yeon Song, Seoul (KR); Kyung-Mo Park, Seoul (KR); Kook-Heui Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1364 days.

(21) Appl. No.: 12/504,370

(22) Filed: Jul. 16, 2009

(65) Prior Publication Data

US 2010/0064138 A1 Mar. 11, 2010

(30) Foreign Application Priority Data

Jul. 16, 2008 (KR) .......... 10-2008-0069350
Aug. 21, 2008 (KR) .......... 10-2008-0082045

(51) Int. Cl.
*H04L 9/32* (2006.01)
*H04L 29/06* (2006.01)
*H04L 9/08* (2006.01)

(52) U.S. Cl.
CPC .............. *H04L 63/18* (2013.01); *H04L 9/0825* (2013.01); *H04L 9/3215* (2013.01); *H04L 9/3271* (2013.01); *H04L 63/166* (2013.01); *H04L 2209/60* (2013.01); *H04L 2209/805* (2013.01)
USPC ............ 713/153; 713/154; 713/160; 713/171

(58) Field of Classification Search
USPC ......... 713/151, 153, 168, 169, 154, 160, 171; 726/3, 12; 709/203, 218, 231
See application file for complete search history.

(56) References Cited

U.S. PATENT DOCUMENTS

| | | | |
|---|---|---|---|
| 6,496,930 B1 | 12/2002 | Ono et al. | |
| 6,920,556 B2* | 7/2005 | Kuehr-McLaren et al. | .. 713/151 |
| 7,350,040 B2 | 3/2008 | Marinescu | |
| 7,996,884 B2* | 8/2011 | Bleumer et al. | ............. 726/6 |
| 2003/0014521 A1* | 1/2003 | Elson et al. | ............. 709/225 |
| 2003/0035542 A1 | 2/2003 | Kim | |
| 2004/0059945 A1* | 3/2004 | Henson et al. | ............. 713/201 |
| 2005/0039004 A1 | 2/2005 | Adams et al. | |
| 2005/0256924 A1* | 11/2005 | Chory et al. | ............. 709/203 |
| 2006/0005263 A1* | 1/2006 | Hardt | ............. 726/28 |
| 2006/0115084 A1* | 6/2006 | Ryu | ............. 380/247 |
| 2006/0195886 A1 | 8/2006 | Ashley | |
| 2006/0264202 A1* | 11/2006 | Hagmeier et al. | ............. 455/411 |
| 2009/0138547 A1* | 5/2009 | Boudreau | ............. 709/203 |
| 2009/0199276 A1* | 8/2009 | Schneider | ............. 726/5 |
| 2011/0055563 A1* | 3/2011 | Chandran et al. | ............. 713/168 |

FOREIGN PATENT DOCUMENTS

| | | |
|---|---|---|
| JP | 2000-082028 | 3/2000 |
| JP | 2003-018567 | 1/2003 |
| JP | 2005-242740 | 9/2005 |
| KR | 1020060038462 | 5/2006 |
| KR | 1020060096286 | 9/2006 |
| KR | 1020080054792 | 6/2008 |

* cited by examiner

*Primary Examiner* — Saleh Najjar
*Assistant Examiner* — Peiliang Pan
(74) *Attorney, Agent, or Firm* — The Farrell Law Firm, P.C.

(57) ABSTRACT

An apparatus and method for providing a security service for UI applications in a network system. In a network supporting a user interface, encryption-unneeded data is distinguished from data in which security identifier is specified, that indicates a need for security between a server and a communication device, and the distinguished data is transmitted over a security channel and a general channel separately.

30 Claims, 6 Drawing Sheets

APPARATUS AND METHOD FOR PROVIDING SECURITY SERVICE OF USER INTERFACE

PRIORITY

This application claims the priority under 35 U.S.C. §119(a) to a Korean Patent Application filed in the Korean Intellectual Property Office on Jul. 16 and Aug. 21, 2008 and assigned Serial Nos. 10-2008-0069350 and 10-2008-0082045, respectively, the entire disclosure of both of which are incorporated herein by reference.

BACKGROUND OF THE INVENTION

1. Field of the Invention

The present invention relates to an apparatus and method for providing a security service for User Interface (UI) application programs (or applications) in a network system, and more particularly, to an apparatus and method for offering a security service in a multimedia-based user interface.

2. Description of the Related Art

As the use of a network, such as inter-computer data exchange, is increasing due to the advent of the Internet, a need to protect data transmitted over the network has occurred. The protection of data transmitted over the network is called 'network security', which is distinguished from the computer system security.

Network security can be conducted over several layers among 7 Open System Interconnection (OSI) layers, including an application layer and a network layer. For example, a network that uses an IEEE802.11-based wireless Local Area Network (LAN) protects the information exchanged by wireless communication in the network layer using a security technique such as Wired Equipment Privacy (WEP) and Wi-Fi Protected Access (WPA).

The conventional network security can be performed through the following process. First, once a client accesses a server, the server provides its public key and server certificate (that a certificate authority issued by authenticating the public key of the server with electronic signature) to the client. The client determines if the server certificate was signed by a trustable certificate authority and if the certificate is still available, and then extracts the public key of the server from the server certificate. Thereafter, the client encrypts an arbitrary message to be used as a session key with the public key of the server and sends the encrypted message to the server. Then the server can obtain the session key by decrypting the encrypted message using its private key. Using the session key, the server encrypts messages based on Symmetric Key Cryptosystem, and then sends the encrypted messages to the client.

Because the conventional network security technology encrypts all messages before transmission without distinction of upper-layer applications, the message complexity is considerably high, causing a reduction in network transmission speed. In addition, for secure communication, the server and the client should take steps of receiving certificates issued from the certificate authority individually, and authenticating the certificates, but this method is unsuitable for the home network that includes a plurality of clients.

SUMMARY OF THE INVENTION

Accordingly, an aspect of the present invention provides an apparatus and method for providing a security service for UI applications in a network system.

Another aspect of the present invention provides an apparatus and method for providing a security service on user interfaces in a network system.

A further another aspect of the present invention provides a security service apparatus and method for transmitting and receiving encryption-needed data and encryption-unneeded data separately in a network system.

According to one aspect of the present invention, there is provided an apparatus for providing a security service for UI applications. The apparatus includes a security identifier specifier for specifying a security identifier indicating an encryption-needed part in encryption-needed data in first data to be transmitted to a communication device supporting a user interface; an encoder for encoding a public key needed for the encryption along with the first data in which the security identifier is specified; and a transmitter for transmitting the encoded first data to the communication device.

According to another aspect of the present invention, there is provided a communication device for providing a security service for UI applications. The communicant device includes a response generator for distinguishing response data in first data in which a security identifier indicating an encryption-needed part is specified, and generating second data by encrypting the distinguished response data; and a transmitter for transmitting the second data to a server in the network.

According to another aspect of the present invention, there is provided a method for providing a security service for UI applications. The method includes specifying a security identifier indicating encryption-needed data in first data to be transmitted to a communication device supporting a user interface; encoding a public key needed for the encryption along with the first data in which the security identifier is specified; and transmitting the encoded first data to the communication device.

According to another aspect of the present invention, there is provided a method for providing a security service for UI applications. The method includes distinguishing response data in first data in which a security identifier indicating encryption-needed data is specified, and generating second data by encrypting the distinguished data; and transmitting the second data to a home server.

DETAILED DESCRIPTION OF EXEMPLARY EMBODIMENTS

Figure 1:
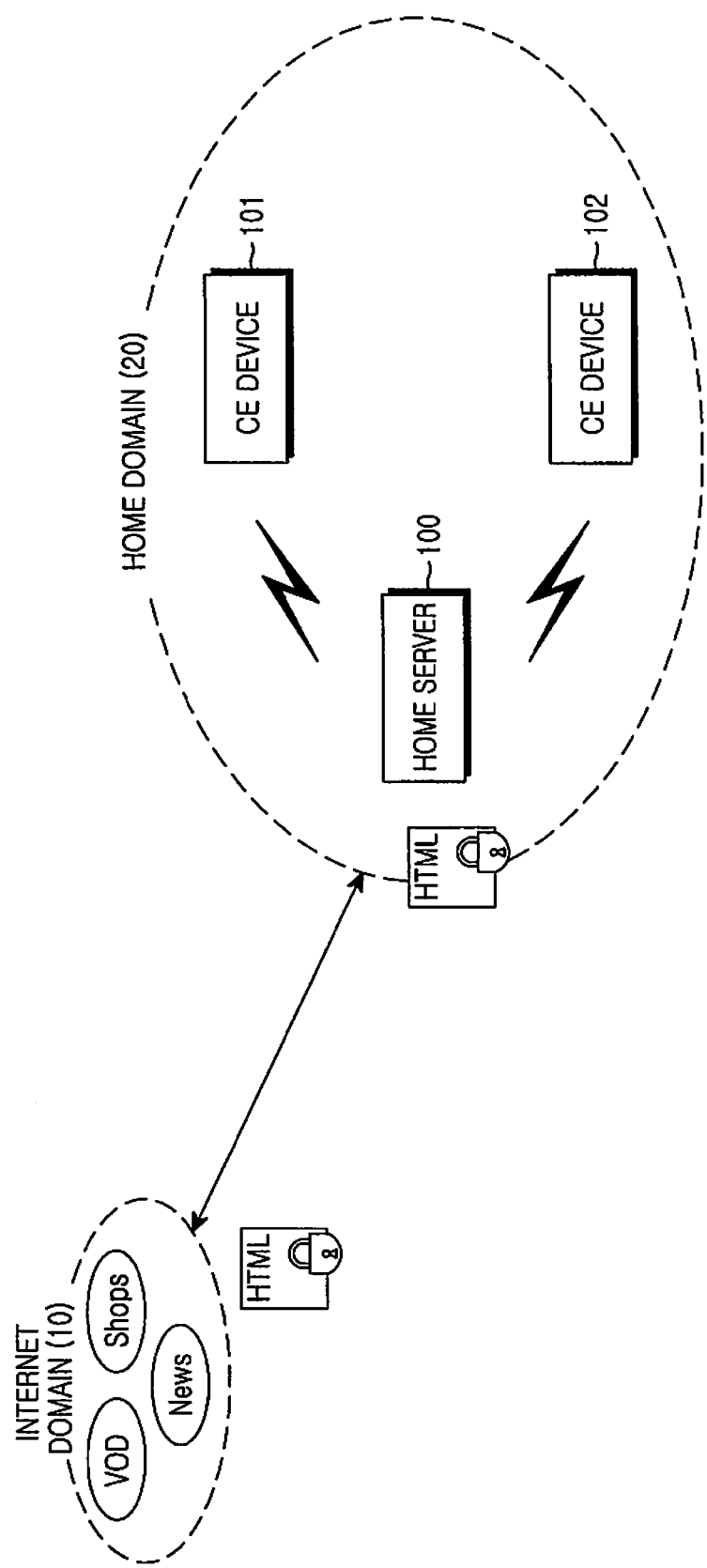
FIG. 1 illustrates a configuration of a home network system according to an embodiment of the present invention.

The advantages and features of the present invention and the ways to achieve the same will be more apparent from the following detailed description of embodiments of the present invention, taken in conjunction with the accompanying drawings. Accordingly, it should be apparent to those skilled in the art that the following description of exemplary embodiments of the present invention are provided for illustrative purpose only and not for the purpose of limiting the invention as defined by the appended claims and their equivalents. Throughout the specification, the same drawing reference numerals will be understood to refer to the same elements, features and structures.

Embodiments of the present invention will now be described with reference to the block diagrams or processing flow diagrams for the description of an apparatus and method for providing a security service in a network. Here, it is to be understood that respective blocks in the processing flow diagrams and combinations thereof can be performed by computer program instructions. Because these computer program instructions can be loaded in the processors of general-purpose computers, special-purpose computers, or other programmable data processing equipments, the instructions that are executed by the processors in the computers or other programmable data processing equipments will create the means carrying out the functions described in the block(s) in the flow diagrams.

Because these computer program instructions can also be stored in computer-operable or computer-readable memories that can be aimed at computers or other programmable data processing equipments to realize the functions in a specific manner, the instructions stored in the computer-operable or computer-readable memories may create production items containing instruction means that perform the functions described in the block(s) in the flow diagrams.

Since the computer program instructions can also be mounted on the computers or other programmable data processing equipments, the instructions executing the computers or other programmable data processing equipments can also provide steps for performing the functions described in the block(s) in the flow diagrams by creating the process in which a series of operation steps are performed on the computers or other programmable data processing equipments and executed by the computers.

Each block can represent a part of a module, a segment or a code that includes one or more executable instructions for executing a specified logic function(s). It is to be noted that in some alternative examples, the functions mentioned in the blocks may occur out of order. For example, two blocks illustrated in succession may be performed substantially at the same time in reality, or the blocks sometimes may be performed in reverse order according to their functions.

In the following detailed description, the present invention proposes a security service offering apparatus and method capable of reducing message complexity and computation needed for security setting and maintenance for user interfaces related to a security service for User Interface (UI) applications in a network environment. Herein, the user interfaces include user interfaces for users, which represent information or interact with the operating system, applications and the like in the network environment. Further, the user interfaces include all components that constitute user environments according to user's purposes and respond thereto in the network environment.

FIG. 1 illustrates a configuration of a network system according to an embodiment of the present invention.

Referring to FIG. 1, a network system based on a home domain 20 may include a home server 100 and one or more Consumer Electronic (CE) devices, or mobile terminal devices 101 and 102.

The home server 100 and the CE devices, or mobile terminal devices 101 and 102, according an embodiment of the present invention can support remote user interfaces. For example, the home server 100 can support a UI application server (e.g., Widget Server) provided in MPEG-4, which is one of the standards for transmitting and storing images and voices in digital data, while the CE devices, or mobile terminal devices 101 and 102, can support a UI application client (e.g., MPEG-4 Remote UI Widget Client) provided in MPEG-4. Hence, the CE devices, or mobile terminal devices 101 and 102, can send a request for information to the home server 100 in a remote place, and the home server 100 can receive the information requested by the CE devices, or mobile terminal devices 101 and 102, from a web server in an Internet domain 10, and provide the received information to the CE devices, or mobile terminal devices 101 and 102. In the following description, it is assumed that the home server 100 and the CE devices, or mobile terminal devices 101 and 102, exchange HTML web documents with each other.

However, the home server 100 and the CE devices, or mobile terminal devices 101 and 102, cannot support a security protocol of the network layer. Secure Socket Layer (SSL) can be an example of the security protocol of the network layer.

SSL, a security protocol for strengthening network security on the Internet, provides security services between a server and a client, such as message confidentiality and integrity, server authentication, client authentication, etc. A structure of the SSL is illustrated in FIG. 2.

Figures 2, 3:
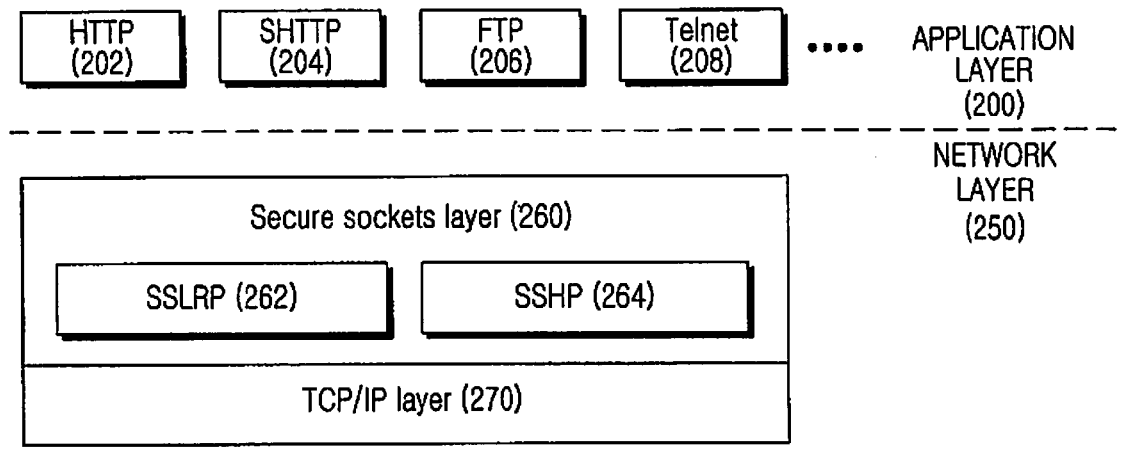
FIG. 2 illustrates a structure of a security protocol applicable to the present invention.
FIG. 3 illustrates a web page in which security identifiers are specified according to an embodiment of the present invention.

Referring to FIG. 2, SSL 260 exits between a transmission protocol (e.g., TCT/IP 270) in the Internet protocol and application protocols 200 (e.g., Hyper-Text Transfer Protocol (HTTP) 202, Secured Hyper-Text Transfer Protocol (SHTTP) 204, File Transfer Protocol (FTP) 206, Telnet 208, etc.). The SSL 260 includes SSL Record Protocol (SSLRP) 262 and SSL Handshake Protocol (SSLHP) 264.

The SSL Handshake Protocol 264 is in charge of negotiating and deciding an encryption method or keys between the server and the client. More specifically, the SSL Handshake Protocol 264 plays a role of establishing one encrypted session between the server and the client and sharing session information during the session. Herein, an example of the session information may include parameters such as a session key for a security service, an encryption algorithm, a compression algorithm, a certificate, etc.

The SSL Record Protocol 262 provides a substantial security service, using the session information shared between the server and the client. For example, the SSL Record Protocol 262 takes charge of dividing information into basic units and sorting them to encrypt the information.

Next, a description will be made of a communication method between the home server 100 and the CE devices, or mobile terminal devices 101 and 102.

First, if the CE devices, or mobile terminal devices 101 and 102, request information, the home server 100 can fetch user interface data stored in a multimedia server by communicating with the multimedia server in the Internet with, for example, the HTTP 202 or the SHTTP 204.

Thereafter, the home server 100 can specify security identifiers in security-needed information among the details of the user interface data. The security-needed information may include, for example, user's ID, password, social security number, credit card number, etc. Here, predefined tags can be used as the security identifiers in the security-needed information. For example, FIG. 3 illustrates a case in which a tag 300 called <secrecy> is used as a security identifier for indicating security-needed information.

Referring to FIG. 3, a <secrecy> tag and a </secrecy> tag are specified before and after each of the parts where a credit card number and a social security number are recorded.

Before transmitting the web page in which security identifiers are specified, to the CE devices, or mobile terminal devices 101 and 102, the home server 100 can determine if there is a security channel formed between the home server 100 and the CE devices, or mobile terminal devices 101 and 102. The home server 100 can transmit the web page with security identifiers specified therein in different ways, according to the presence/absence of the security channel. A detailed description thereof will be given with reference to FIGS. 4 and 5.

Figure 4:
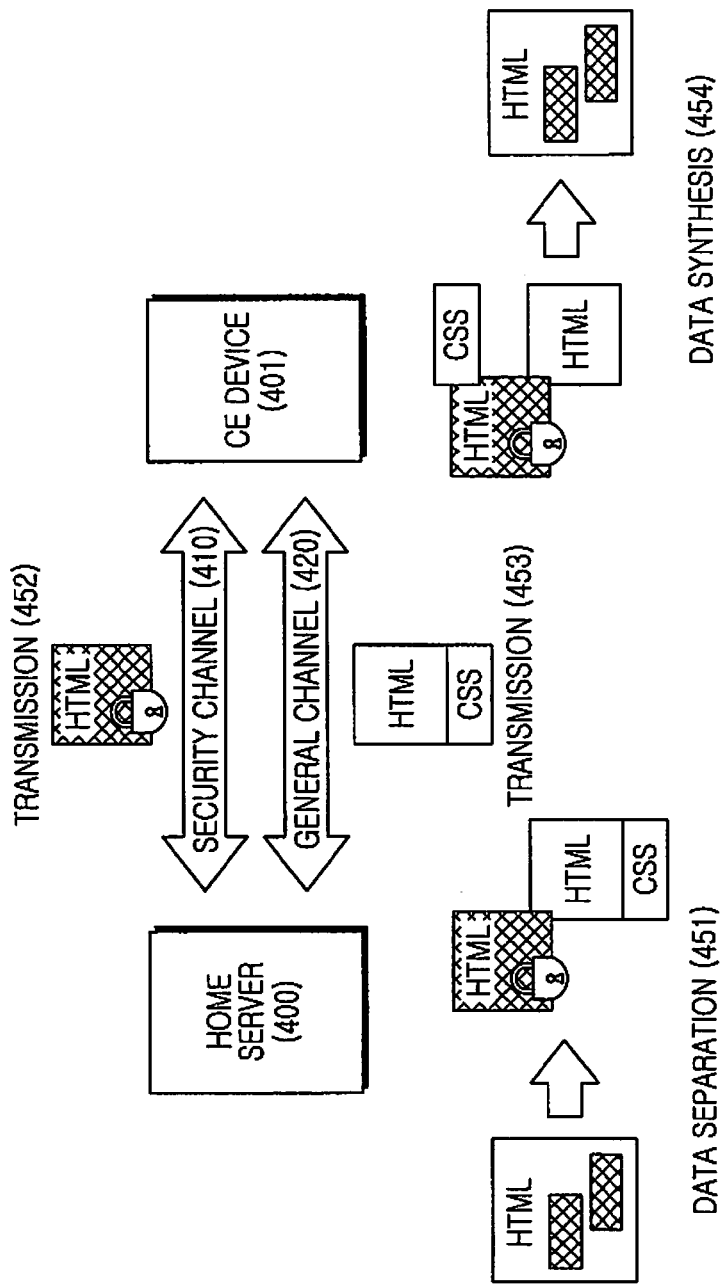
FIG. 4 illustrates a communication procedure between a home server and a Consumer Electronic (CE) device, or a mobile terminal device, when a security channel is formed between the home server and the client according to an embodiment of the present invention.

FIG. 4 illustrates a communication method for a case where a security channel exists between a home server and a CE device, or a mobile terminal device, according to an embodiment of the present invention.

Referring to FIG. 4, if a security channel exists between a home server 400 and a CE device, or a mobile terminal device 401, through a security protocol such as SSL, the home server 400 can separate in step 451 a security identifier-specified part (BIFS/LASeR) and a security identifier-unspecified part (BIFS/LASeR Template) from user interface data. In step 452, the security identifier-specified part in the user interface data can be transmitted to the CE device, or mobile terminal device 401, over the security channel 410. In step 453, the security identifier-unspecified part in the user interface data can be transmitted to the CE device, or mobile terminal device 401, over a general channel 420. That is, the amount of data for encryption is reduced by distinguishing the security-unneeded information from the security-needed information and transmitting the information over separate channels. Herein, the term defined as "part" includes a part or group of data, or a plurality of data groups, and the 'data' may be grouped on an object-by-object basis.

When data is transmitted over the security channel 410 and the general channel 420 as described above, the CE device, or mobile terminal device 401, can provide the entire user interface data to the user by synthesizing the data received over the security channel 410 and the general channel 420 in step 454.

Meanwhile, when a response to the received data is transmitted from the CE device, or mobile terminal device 401, to the home server 400, data related to a security identifier-specified part in the data to be transmitted as the response can be transmitted to the home server 400 over the security channel 410. However, data related to a security identifier-unspecified part in the data to be transmitted as the response can be transmitted to the home server 400 over the general channel 420.

Figure 5:
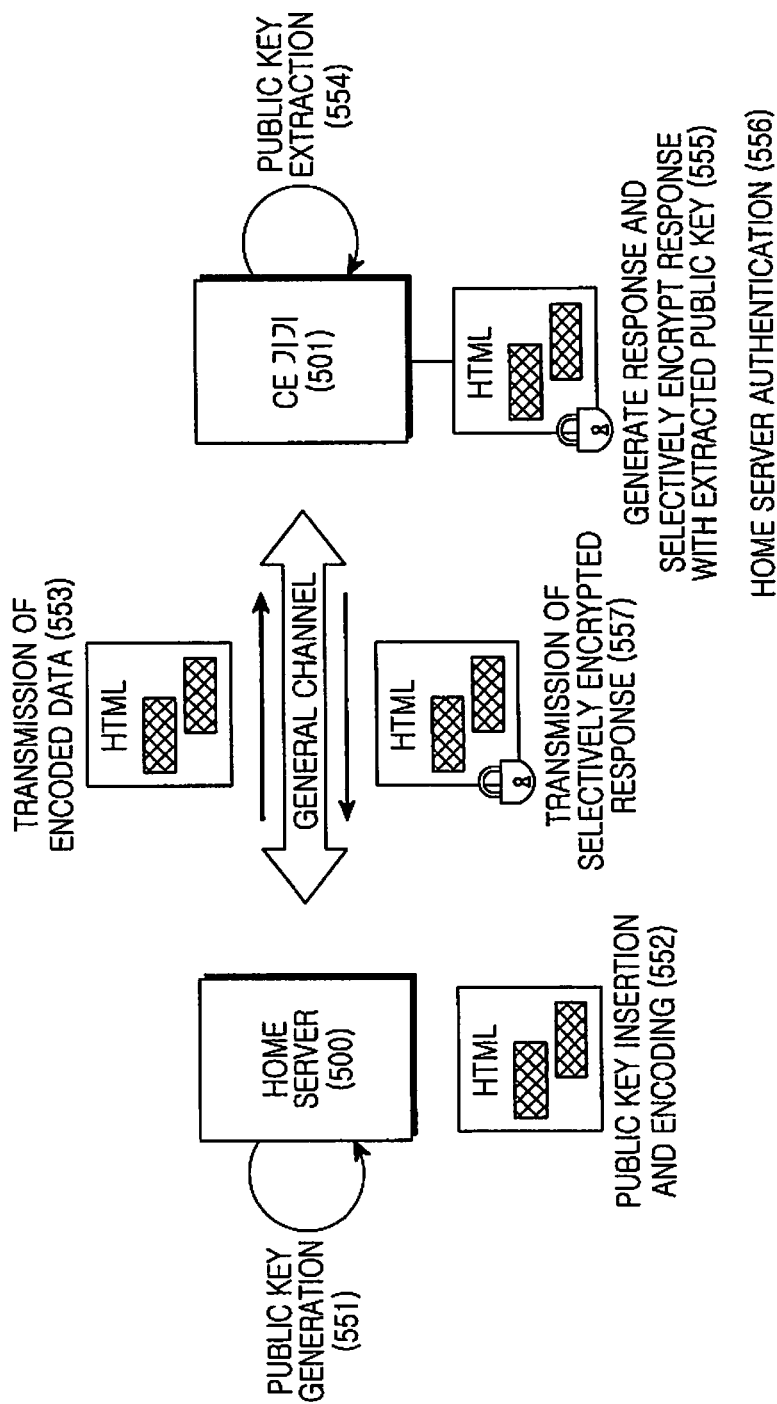
FIG. 5 illustrates a communication procedure between a home server and a CE device, or a mobile terminal device, when no security channel is formed between the home server and the client according to an embodiment of the present invention.

FIG. 5 illustrates a communication method for a case where no security channel is formed between a home server and a CE device, or a mobile terminal device, according to an embodiment of the present invention.

Referring to FIG. 5, if no security channel is formed between a home server 500 and a CE device, or a mobile terminal device 501, the home server 500 can first arbitrarily generate a public key pair needed to encrypt security identifier-specified multimedia data in step 551. The generated public key pair can be continuously used in a fixed way regardless of a session to, for example, the CE device, or mobile terminal device 501. As another example, a public key pair can also be generated individually for a session to the CE device, or mobile terminal device 501.

Upon generation of the public key pair, the home server 500 can encode security identifier-specified data, for example, MPEG-4 LASeR/BIFS content, in step 552. As mentioned in FIG. 3, the home server 500 can insert a public key in an MPEG-4 LASeR/BIFS header of the web page. The home server 500 can also insert a public key in an MPEG-4 header. Thereafter, in step 553, the home server 500 can transmit the encoded data, e.g., MPEG-4 Scene content to the CE device, or mobile terminal device 501. The MPEG-4 Scene content may include all of images, voices, and video content including images and voices.

Meanwhile, when the encoded MPEG-4 Scene content is received at the CE device, or mobile terminal device 501, over a general channel, the CE device, or mobile terminal device 501 can extract a public key from the received MPEG-4 content in step 554. Thereafter, in step 555, the CE device, or mobile terminal device 501 can generate a response to the received MPEG-4 content based on user's private information. Further, the CE device, or mobile terminal device 501 may encrypt data included in a <secrecy> tag in the generated response. The encryption can be conducted using the public key extracted from a LASeR/BIFS header or other MPEG headers of the MPEG-4 content received at the CE device, or mobile terminal device 501. Thereafter, in step 556, the CE device, or mobile terminal device 501, may perform an authentication operation on the home server 500. When the authentication on the home server 500 is passed, the CE device, or mobile terminal device 501, can transmit a partially encrypted response to the home server 500 in step 557.

The authentication on the home server 500 may be performed using either the existing normal shared secret key shared by the home server 500 and the CE device, or mobile terminal device 501, or the existing normal shared secret key and a temporary shared secret key that is newly generated in the CE device, or mobile terminal device 501, for authentication on the home server 500.

An authentication process regarding the home server 500 based on the normal shared secret key will now be described.

When encrypting security identifier-specified MPEG-4 content and sending it to the CE device, or mobile terminal device 501, the home server 500 may generate a Message Authentication Code (MAC) for the details of MPEG-4 content, using its own normal shared secret key. The home server 500 may attach the generated MPEG-4 content MAC to the encrypted MPEG-4 content and transmit it to the CE device, or mobile terminal device 501.

Upon receipt of the encrypted MPEG-4 content, the CE device, or mobile terminal device 501, may generate an MPEG-4 content MAC for the received MPEG-4 content, using its own normal shared secret key. Thereafter, the CE device, or mobile terminal device 501, may compare its generated MPEG-4 content MAC with the MAC attached to the received MPEG-4 content. If the two MACs are identical as a result of the comparison, the CE device, or mobile terminal device 501, may authenticate that the home server 500 that transmitted the MPEG-4 content is not unavailable.

Figure 6:
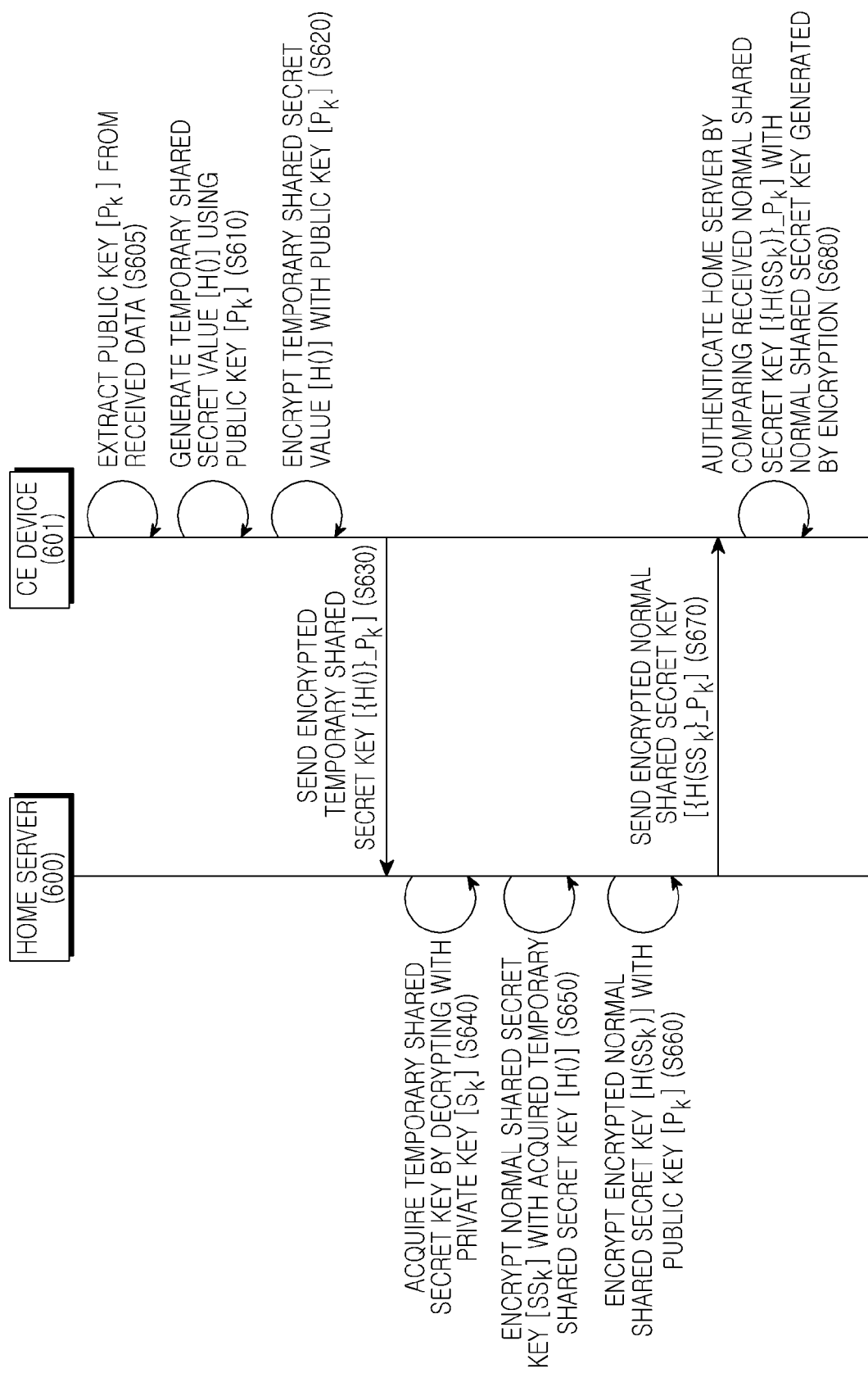
FIG. 6 illustrates a home server authentication process according to an embodiment of the present invention.

FIG. 6 illustrates a home server authentication process based on a normal shared secret key and a temporary shared secret key according to an embodiment of the present invention.

Referring to FIG. 6, when a public key $P_k$ is extracted from an encrypted MPEG-4 content (Step S605), a CE device, or a mobile terminal device 601, may generate a hash value HO associated with the public key $P_k$ (Step S610). The CE device, or mobile terminal device 601, may use the generated hash value H( ) as a temporary shared secret key. Thereafter, the CE device, or mobile terminal device 601, may encrypt the temporary shared secret key H( ) using the extracted public key $P_k$ (Step S620), and then provide it to a home server 600 (Step S630).

Upon receipt of the encrypted temporary shared secret key H( )_$P_k$, the home server 600 may acquire a temporary shared secret key H( ) by decrypting the encrypted temporary shared secret key H( )_$P_k$ with its own private key $S_k$ (Step S640). Thereafter, the home server 600 may encrypt its own normal shared secret key $SS_k$ using the acquired temporary shared secret key H( ) (Step S650). The home server 600 may encrypt again the normal shared secret key H($SS_k$)_$P_k$ encrypted with the temporary shared secret key HO, using the public key $P_k$ (Step S660).

Thereafter, the home server 600 may transmit the normal shared secret key H($SS_k$)_$P_k$ encrypted with the public key $P_k$ to the CE device, or mobile terminal device 601 (Step S670).

Upon receipt of the normal shared secret key H($SS_k$)_$P_k$ encrypted with the public key $P_k$, the CE device, or mobile terminal device 601, may encrypt its own normal shared secret key $SS_K$ with the previously extracted public key $P_k$ and its generated temporary shared secret key H( ). Thereafter, the CE device, or mobile terminal device 601, may compare the normal shared secret key encrypted by the home server 600 with its encrypted normal shared secret key (Step S680). If the two values are identical as a result of the comparison, the CE device, or mobile terminal device 601, may authenticate that the associated home server 600 is not an unavailable device. However, if the two values are not identical as a result of the comparison, the CE device, or mobile terminal device 601, may stop the data transmission, regarding the associated home server 600 as an unavailable device.

In the foregoing authentication process on the home server 600, the normal shared secret key refers to a key that the home server 600 and the CE device, or mobile terminal device 601, previously agreed to share. This normal shared secret key can be a password, a passphrase and a large number, and can also be previously stored in the home server 600 or the CE device, or mobile terminal device 601. In the CE device, or mobile terminal device 601, the normal shared secret key may be input by a user in the process of authenticating the home server 600.

The following embodiment of the present invention is characterized by representing elements for providing a security service, using an MPEG-4 Lightweight Application Scene Representation (LASeR) language. However, it could be obvious that the present invention is not limited to the LASeR language.

Next, elements and attributes serving as security identifiers capable of indicating security-needed parts will be defined and described to provide a security service.

TABLE 1

...
<g id="Input" transform='translate(50, 20)'>
    <rect x="O" y="25" width="156" height="26" rx="3" ry="3"
        fill="white" stroke-width="3" stroke="black"/>
        <encryption id="..." keyIDRef="..." encrypted="true">
            <text id="security_infomation" x="3" y="27"
                width="150"
height="20" font-size="18" font-family="Arial" editable="simple"
focusable="true" pointer-events="boundingBox"/>
        </encryption>
</g>
...

Table 1 above defines a new element 'encryption' for indicating security-needed specific information, and represents it in LASeR content. The security-needed specific information may include, for example, user's ID, password, social security number, credit card number, etc.

In Table 1, 'g', 'rect', 'text', etc. are some of Rich Media components defined in LASeR. For example, 'rect' is an element drawing a rectangle. The example above represents an input box. In the example of Table 1, it is shown that by use of a newly defined and described 'encryption' element, a child element of the 'encryption' element, i.e., an element included in the 'encryption' element is a security-needed part.

Therefore, in the above example of representing an input box, it is shown that the information that a user inputs as a value of a 'text' element with an id attribute value of 'security_information', is security-needed information, since it is a child element of the 'encryption' element. The 'encryption' element may have attributes such as element's id, encryption-related information to be used for security, and encryption necessity. The encryption-related information to be used for security may include an encryption method, reference information of a key for encryption, etc. In Table 1, attributes of the 'encryption' element are represented by 'id', 'keyIDRef (replaceable with xlink:hreq)', 'encrypted', etc.

Table 2 below shows an example in which a new attribute 'encrypted' for indicating security-needed specific information is defined and described in LASeR content.

TABLE 2

...
<g id="Input" transform='translate(50, 20)'>
<rect x="O" y="25" width="156" height="26" rx="3" ry="3"
    fill="white" stroke-width="3" stroke="black"/>
    <text id="security_information" x="3" y="27" width="150"
    height="20"
font-size="18" font-family="Arial" editable="simple" focusable="true"
pointer-events="boundingBox" encrypted="true"/>
</g>
...

In the example of Table 2, it is indicated that an element with an 'encrypted' attribute of 'true' needs security. A value ('true' or 'false') of the 'encrypted' attribute may be succeeded to a child element. Accordingly, referring to Table 2, in the example of representing an input box, it is shown that the information that a user inputs as a value of a 'text' element with an id attribute value of 'security_information' is security-needed information, since the 'encrypted' element is 'true'.

Table 3 below shows an example in which a new attribute 'encryptionKeyIDRef' for indicating security-needed specific information is defined and described in LASeR content.

TABLE 3

...
<g id="Input" transform='translate(50, 20)'>
<rect x="O" y="25" width="156" height="26" rx="3" ry="3"
    fill="white" stroke-width="3" stroke="black"/>
    <text x="3" y="27" width="150" height="20" font-size="18"
    font-family="Arial" editable="simple" focusable="true"
    pointer-events="boundingBox"
    encryptionKeyIDRer ="..."/>
</g>
...

In the example of Table 3, it is shown that an element with an 'encryptionKeyIDRef' attribute is a security-needed element, and that encryption can be conducted using an encryption Key that should be referenced to encrypt a value (text input value) of a relevant element.

Therefore, in the example of Table 3 of representing an input box, the information that the user inputs as a value of a 'text' element with an id attribute value of 'security_information' is encrypted using the encryption Key that is referenced by the 'encryptionKeyIDRef' attribute. The 'encryptionKeyIDRef' can be defined as a reference type that can make reference to structured information.

The new elements and attributes described in Table 1 to Table 3 can be used either independently, or in combination.

Next, a public key provided to offer a security service is defined and described. The public key described herein means an element and information that can encrypt or decrypt encryption-needed data.

Table 4 and Table 5 below show examples in which attributes related to the public key are defined and described in a content header. A terminal can encrypt and decrypt security-needed parts in content based on the public key-related information in the header.

TABLE 4

<LASeRHeader ... 'encryptionKeyIDRef'=" <!-- anyURI for securityKey -->" />

Table 4 shows an example in which a new 'encryptionKeyIDRef' attribute is defined and described in a content header to represent public key-related information. In Table 4, security-needed information can be encrypted using the public key referenced by the 'encryptionKeyIDRef' attribute. The 'encryptionKeyIDRef' can be defined as a reference type that can make reference to structured information.

TABLE 5

<LASeRHeader ... securityKeyMethod="..." securityKeyValue="A23B45C56"/>

Table 5 shows an example in which new attributes 'securityKeyMethod' and 'securityKeyValue' are defined and described in a content header to represent public key-related information. Here, 'securityKeyMethod' indicates an encryption method (public key type or public key encryption method) for encrypting security-needed information using the public key, and 'securityKeyValue' indicates a value of the public key. The 'securityKeyMethod' may have a set value according to an encryption method, and may be defined as a reference type that can reference structured information.

Table 6 below shows an example in which a new LASeR command for a public key-related element is defined and described. In LASeR content, commands are bases of scene segments. That is, one command becomes one scene segment. NewScene, Add, Delete, Insert, RefreshScene, etc. are used as LASeR commands, and LASeR content can be corrected, changed and updated using these commands.

TABLE 6

<NewScene>
    <svg id="root" width="333" height="250">
        <g>...</g>
    </svg>
</NewScene>
<Insert ref="#root" attributeName="children">
    <text id="security" x="3" y="27" width="150" height="20" font-size="18" font-family="Arial" editable="simple" focusable="true" pointer-events="boundingBox"/>

TABLE 6-continued

</Insert>
<securityKey id="#security" Type="..." xmlns="..." MimeType="...">
    <securityKeyID> AO1 </securityKeyID>
    <securityKeyName> A </securityKeyName>
    <encryptionMethod algorithm='.../>
    <securityKeyData>
        <securityValue>A23B45C56</securityValue>
    </securityKeyData>
</securityKey>

Referring to Table 6, the newly defined 'securityKey' command contains encryption-related information. That is, information such as a public key can be included in the 'securityKey' command. The 'securityKey' command may have encryption-related information's type, namespace (xmlns), mine type, etc. as its attributes.

In the present invention, the 'securityKey' command includes information such as an encryption key's id 'securytKeyID', an encryption key's name 'securityKeyName', an encryption method 'encryptionMethod', an encryption key's value 'securityKeyData', etc. The encryption method 'encryptionMethod' may have an attribute indicating an encryption algorithm, and the encryption key's value 'securityKeyData' may be defined to have several key values, or defined to represent one key value. The above-described 'securityKey' elements may also be defined as attributes of the 'securityKey' command, and can be modified or changed in various methods if information the 'securityKey' command includes or intends to carry and the purpose of the information are the same.

Table 7 below shows an example in which a new Simple Aggregation Format (SAF) Access Unit (AU) for public key-related elements is defined and described. LASeR content may be serviced by multiplexing many logical media streams to a single physical stream. A format for this is the SAF, which is a technology developed to multiplex and synchronize LASeR Elementary Streams (ESs). Each stream can be processed on an AU-by-AU basis. The AU is a basic unit of data that should be processed at the same time, when LASeR content (or stream) is serviced by multiplexing.

TABLE 7

```
Class securityConfigUnit {
    bit(8) numOfSecurityKeys;
    for (int i=0; i<numOfSecurityKeys: i++) {
        bit(8) id;
        bit(8) securityKeyID;
        unit(8) securityKeyName;
        unit(12) encryptionMethodLength;
        byte[encryptionMethodLength] encryptionMethod;
        unit(12) securityKeyValueLength;
        byte[securityKeyValueLength] securityKeyValue;
    }
}
```

Referring to Table 7, a newly defined 'securityConfigUnit' contains encryption-related information, and information such as a public key can be included in the encryption-related information. The 'securityConfigUnit' includes the number 'numOfSecurityKeys' of encryption keys used in LASeR content, an encryption key's id 'securytKeyID', an encryption key's name 'securityKeyName', an encryption method 'encryptionMethod', an encryption key's value 'securityKeyValue', etc. The encryption key's value 'securityKeyValue' may be defined to have several key values, or defined to represent a single key value.

Although not illustrated in detail in Table 7, information referencing structured information indicating encryption information, mimeType of encryption information, url information for referencing external information, temporary storage, expiration time of information, etc. may also be included. If information the 'securityConfigUnit' includes or intends to carry and the purpose of the information are the same, it can be modified and changed in various methods. The defined security service-related information and descriptor can be changed in a relevant format according to the system and applied technology, and can be considered the same if the purpose of the informant provided by the information is the same. Based on a delivery method, an information security method and the like, session information such as a session key, and information such as an informant security method can be added, changed and described.

Next, with reference to FIGS. 7 and 8, a description will be made of a home server 700 and a CE device, or a mobile terminal device 800, according to an embodiment of the present invention.

Figure 7:
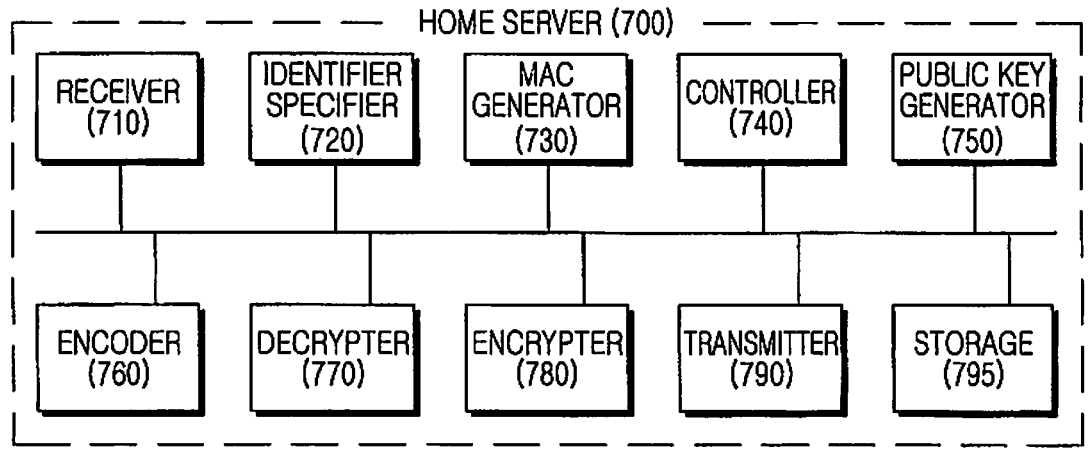
FIG. 7 illustrates a structure of a home server according to an embodiment of the present invention.

FIG. 7 illustrates a structure of a home server 700 according to an embodiment of the present invention.

As illustrated in FIG. 7, the home server 700 includes a receiver 710, a security identifier specifier 720, a MAC generator 730, a controller 740, a public key generator 750, an encoder 760, a decrypter 770, an encrypter 780, a transmitter 790, and a storage 795.

The receiver 710 may receive a request and a response from a CE device, or a mobile terminal device. The receiver 710 may also receive MPEG-4 content pages and/or web-based user interface data stored in an MPEG-4 content server. The web-based user interface data includes specific Internet user interface data that provides applications such as, for example, widgets and gadgets.

The security identifier specifier 720 may specify a security identifier in encryption-needed information in an MPEG-4 content page received from the MPEG-4 content server. A preset tag can be used as a security identifier.

The MAC generator 730 may generate an MPEG-4 content MAC for an MPEG-4 content page to be delivered to the CE device, or mobile terminal device. The MPEG-4 content MAC can be generated using a normal shared secret key held by the home server 700, and can be provided to the CE device, or mobile terminal device, after being attached to an MPEG-4 content page.

The controller 740 may determine a delivery method of a security identifier-specified web page according to whether a security channel such as SSL is formed between the home server 700 and the CE device, or mobile terminal. To be specific, if a security channel such as SSL is formed between the home server 700 and the CE device, or mobile terminal device, the controller 740 enables security identifier-specified parts and security identifier-unspecified parts in the entire web page to be transmitted to the CE device, or mobile terminal device, over the security channel and the general channel, respectively. However, if the security channel like SSL is not formed between the home server 700 and the CE device, or mobile terminal device, the controller 740 may enable the security identifier-specified MPEG-4 content page to be transmitted to the CE device, or mobile terminal device, over the general channel.

The public key generator 750 may arbitrarily generate a public key pair needed to encrypt information.

The encoder 760 may encode a security identifier-specified MPEG-4 content page. The encoder 760 may add one public key in the public key pair generated by the public key generator 750, to an MPEG-4 header or an MPEG-4 LASeR/BIFS header in an MPEG-4 content page.

Upon receipt of encrypted information from the CE device, or mobile terminal device, the decrypter 770 can decrypt the encrypted information. For example, the decrypter 770 may decrypt a temporary shared secret key that the CE device, or mobile terminal device, encrypted with the public key, using a previously stored private key. As a result, the temporary shared secret key can be acquired.

The encrypter 780 can encrypt a normal shared secret key held by the home server 700, using the previously generated shared key and the acquired temporary shared secret key.

The transmitter 790 may transmit information to the CE device, or mobile terminal device. For example, the transmitter 790 may transmit a security identifier-specified MPEG-4 content page to the CE device, or mobile terminal device 800. In this state, if a security channel like SSL is formed between the home server 700 and the CE device, or mobile terminal device, the transmitter 790 may separately transmit security identifier-specified parts and security identifier-unspecified parts over the security channel and the general channel, respectively, making it possible to reduce the message complexity caused by the maintenance of the security channel. However, if the security channel like SSL is not formed between the home server 700 and the CE device, or mobile terminal device, the transmitter 790 may transmit a security identifier-specified MPEG-4 content page to the CE device, or mobile terminal device, over the general channel.

The storage 795 can store information needed to provide the security service. For example, the storage 795 can store a public key needed to encrypt information, a private key for decrypting encrypted information, a normal shared secret key needed to perform home server authentication, and so forth. The storage 795 may be realized with, but not limited to, at least one of a non-volatile memory element such as cache, Read Only Memory (ROM), Programmable ROM (PROM), Erasable Programmable ROM (EPROM), Electrically Erasable Programmable ROM (EEPROM) and Flash memory, and a volatile memory element such as Random Access Memory (RAM).

Figure 8:
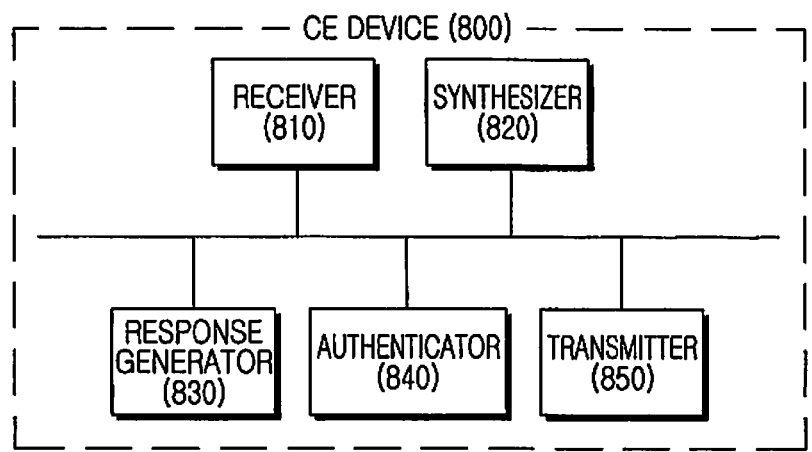
FIG. 8 illustrates a structure of a CE device, or a mobile terminal device, according to an embodiment of the present invention.

FIG. 8 illustrates a structure of a CE device, or a mobile terminal device, according to an embodiment of the present invention.

Referring to FIG. 8, a CE device, or a mobile terminal device 800, includes a receiver 810, a synthesizer 820, a response generator 830, an authenticator 840, and a transmitter 850.

Referring to FIG. 8, the receiver 810 can receive from the home server 700 the information requested by the CE device, or mobile terminal device 800, e.g., an MPEG-4 content page. The MPEG-4 content page may be received over a security channel and a general channel in a separated way, or over a general transmission channel.

The synthesizer 820 may synthesize the data that is received over the security channel and the general channel in a separated way. As a result, the security identifier-specified MPEG-4 content page can be provided to the user.

The response generator 830 may generate a response to the received MPEG-4 content page. For example, the response generator 830 may generate a response by receiving user's private information such as ID, password, social security number, and credit card number. The response generator 830 may encrypt data in a <secrecy> tag contained in the generated response. A public key extracted from an MPEG-4 content page received from the home server 700 can be used for the encryption.

The authenticator 840 may authenticate the home server 700. The authentication on the home server 700 may be performed using only a normal shared secret key previously shared between the home server 700 and the CE device, or mobile terminal device 800, or performed using a temporary shared secret key that is generated using a normal shared secret key and a public key as in FIG. 6.

The transmitter 850 may transmit information to the home server 700. For example, the transmitter 850 may transmit the response generated by the response generator 830. If there is a security channel connected to the home server 700, the transmitter 850 may transmit security-needed MPEG-4 content data in the response over the security channel, and security-unneeded MPEG-4 content data over the general channel.

As described above, the apparatus and method for providing a security service for UI applications in a network system according to the present invention have the following advantages. When a remote UI application or the like temporarily needs security in the network environment, it selectively encrypts only the important information, thus contributing to reducing message complexity and computation needed for secure communication between network devices. In addition, improved network transmission speed can be ensured by providing selective encryption for important data.

In the embodiments described above, components constituting the home server 700 and the CE device, or mobile terminal device 800, may be realized with a sort of modules. The term 'module' means a software component, or a hardware component such as Field Programmable Gate Array (FPGA) and Application Specific Integrated Circuit (ASIC), and the module performs certain roles. However, the module is not limited to software or hardware. The module may be constructed to exist in an addressable recording medium, and to execute one or more processors. Therefore, the module may include, by way of example, components, such as software components, object-oriented components, class components and task components, and also include processes, functions, attributes, procedures, subroutines, program code's segments, drivers, firmware, microcode, circuitry, data, databases, data structures, tables, arrays, and variables. Functions provided in components and modules may be combined with a less number of components and modules, or may be further separated with additional components and modules. In addition, the components and modules may execute one or more CPUs in their device.

In addition to the above-described embodiments, embodiments of the present invention may also be implemented through a medium, e.g. computer-readable medium, which includes computer-readable codes/commands for controlling at least one processing element of the foregoing embodiments. The medium may correspond to medium/mediums enabling storage and/or transmission of the computer-readable codes.

The computer-readable codes can not only be recorded in a medium, but also be transmitted over the Internet, and the medium may include, for example, a recording medium such as magnetic recording medium (e.g., ROM, floppy discs, hard discs, etc.) and optical recording medium (e.g., CD-ROM or DVD), and a transmission medium such as carrier waves. Further, according to embodiments of the present invention, the medium may also be a signal such as a synthesized signal and a bit stream. Because the mediums may also be a distributed network, the computer-readable codes can be stored/transmitted and executed in a distributed manner. In addition, by way of an example only, a processing element may include a processor or a computer processor, and the processing element may be distributed and/or included in one device.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. An apparatus for providing a security service in a user interface, comprising:
a security identifier specifier for specifying a security identifier identifying a portion of requested data, from details of the requested data, that will require encryption when provided by a communication device supporting the user interface, wherein the portion of the requested data is included in first data that is to be transmitted to the communication device;
an encoder for encoding the first data in which the security identifier is specified and in which a public key, used for the encryption of the requested data, is inserted; and
a transmitter for transmitting the encoded first data to the communication device;
wherein the public key is inserted in one of a Moving Pictures Experts Group-4 (MPEG-4) content header and an MPEG-4 header of the first data.

2. The apparatus of claim 1, wherein a file format of the first data supports an MPEG-4 standard, and the security identifier includes a content tag supported by the MPEG-4 standard.

3. The apparatus of claim 1, wherein the transmitter transmits security identifier-specified data in the first data over a security channel and transmits security identifier-unspecified data in the first data to the communication device over a general channel, when the security channel is connected to the communication device, and
wherein the transmitter transmits encoded data of the security identifier-specified data and the security identifier-unspecified data to the communication device over the general channel, when the security channel is not connected to the communication device.

4. The apparatus of claim 1, further comprising:
a decrypter for acquiring a temporary shared secret key by decrypting the temporary shared secret key that is encrypted by the communication device with the public key, using a previously stored private key; and
an encrypter for encrypting a normal shared secret key shared with the communication device, using the acquired temporary shared secret key and a previously generated shared key;
wherein the normal shared secret key is used for authentication upon request of the communication device.

5. The apparatus of claim 4, further comprising a receiver for encrypting the requested data distinguished by the security identifier in the first data, with the public key, and receiving the requested data encrypted with the public key from the communication device.

6. The apparatus of claim 5, wherein the public key is generated individually for a session to the communication device.

7. An apparatus for providing a security service in a user interface, comprising:
a response generator for receiving first data including a public key and specified with a security identifier from a home server, distinguishing a portion of requested data, from details of the requested data, in the first data, wherein the portion of the requested data is indicated by the security identifier identifying that the portion of the requested data requires encryption, and generating second data by encrypting the requested data; and a transmitter for transmitting the second data to the home server;

wherein the public key is inserted in one of a Moving Pictures Experts Group-4 (MPEG-4) content header and an MPEG-4 header of response data.

8. The apparatus of claim 7, further comprising a receiver for receiving security identifier-specified data in the first data over a security channel and receiving security identifier-unspecified data over a general channel when there is the security channel connected to the home server, and receiving the first data over the general channel when there is no security channel connected to the home server.

9. The apparatus of claim 8, further comprising a synthesizer for synthesizing data received over the security channel and the general channel.

10. The apparatus of claim 7, wherein a file format of the first data supports an MPEG-4 standard, and the security identifier includes a content tag supported by the MPEG-4 standard.

11. The apparatus of claim 7, wherein the response generator encrypts the requested data that needs to be encrypted in the first data associated with the security identifier, using the public key extracted from the first data.

12. The apparatus of claim 11, further comprising an authenticator for encrypting a first normal shared secret key shared with the home server, using the public key and a temporary shared secret key generated with the public key, and authenticating the home server when the encrypted first normal shared secret key and a second normal shared secret key encrypted by the home server are identical to each other.

13. The apparatus of claim 12, wherein the authenticator authenticates the home server by acquiring the temporary shared secret key by decrypting the temporary shared secret key encrypted with the public key with a previously stored private key, and generating the encrypted second normal shared secret key by encrypting previously stored second normal shared secret key with the acquired temporary shared secret key and a previously generated shared key.

14. A method for providing a security service in a user interface, comprising:

specifying a security identifier identifying a portion of requested data, from details of the requested data, that will require encryption when provided by a communication device supporting the user interface, wherein the portion of the requested data is included in first data that is to be transmitted to the communication device;

encoding the first data in which the security identifier is specified and in which a public key, required for the encryption of the requested data, is inserted; and transmitting the encoded first data to the communication device;

wherein the public key is inserted in one of a Moving Pictures Experts Group-4 (MPEG-4) content header and an MPEG-4 header of the first data.

15. The method of claim 14, wherein a file format of the first data supports an MPEG-4 standard, and the security identifier includes a content tag supported by the MPEG-4 standard.

16. The method of claim 15, wherein the content tag comprises at least one of an encryption element indicating security-needed information, an encryption element indicating a need for security, and an encryption element indicating an encryption key to be referenced.

17. The method of claim 15, wherein any one of the MPEG-4 content header and the MPEG-4 header includes the public key-related information, which includes at least one of an element indicating an encryption method for security-needed information and an encryption key value that varies according to the encryption method.

18. The method of claim 17, wherein the public key-related information further includes at least one encryption command applied to the encryption method.

19. The method of claim 17, wherein the public key-related information includes information about a basic unit of encryption that should be processed at a same time, wherein the information includes at least one of a number of encryption keys, an encryption key identifier, an encryption key name, an encryption method, and an encryption key value.

20. The method of claim 14, wherein the transmission comprises transmitting security identifier-specified data in the first data to the communication device over a security channel and transmitting security identifier-unspecified data in the first data to the communication device over a general channel, when the security channel is connected to the communication device; and wherein the transmission comprises transmitting encoded data of the security identifier-specified data and the security identifier-unspecified data to the communication device over the general channel, when the security channel is not connected to the communication device.

21. The method of claim 14, further comprising:

acquiring a temporary shared secret key by decrypting the temporary shared secret key that is encrypted by the communication device with the public key, using a previously stored private key; and encrypting a normal shared secret key shared with the communication device, using the acquired temporary shared secret key and a previously generated shared key;

wherein the normal shared secret key is used for authentication upon request of the communication device.

22. The method of claim 21, further comprising encrypting the requested data distinguished by the security identifier in a response to the first data, with the public key, and receiving the requested data encrypted with the public key from the communication device.

23. The method of claim 14, wherein the public key is generated individually for a session to the communication device.

24. A method for providing a security service in a user interface, comprising:

receiving first data including a public key and specified with a security identifier from a home server;

distinguishing a portion of requested data, from details of the requested data, in the first data received from the home server, wherein the portion of the requested data is indicated by the security identifier identifying that the portion of the requested data requires encryption, and generating second data by encrypting the requested data; and transmitting the second data to the home server;

wherein the public key is inserted in one of a Moving Pictures Experts Group-4 (MPEG-4) content header and an MPEG-4 header of response data.

25. The method of claim 24, further comprising: receiving security identifier-specified data in the first data over a security channel and receiving security identifier-unspecified data over a general channel, when there is the security channel connected to the home server; and receiving the first data over the general channel, when there is no security channel connected to the home server.

26. The method of claim 25, further comprising synthesizing data received over the security channel and the general channel.

27. The method of claim 24, wherein a format of the first data supports an MPEG-4 standard, and the security identifier includes a content tag supported by the MPEG-4 standard.

28. The method of claim 24, wherein the generation of second data comprises encrypting the requested data associated with the security identifier, with the public key extracted from the first data.

29. The method of claim 28, further comprising encrypting first normal shared secret key shared with the home server using the public key and a temporary shared secret key generated with the public key, and authenticating the home server when the encrypted first normal shared secret key and a second normal shared secret key encrypted by the home server are identical to each other.

30. The method of claim 29, further comprising acquiring the temporary shared secret key by decrypting the temporary public secret key encrypted with the public key using a previously stored private key, and generating the encrypted second normal shared secret key by encrypting a previously stored second normal shared secret key with the acquired temporary shared secret key and a previously generated shared key.

* * * * *